United States Patent [19]

Pearse

[11] 3,927,249

[45] Dec. 16, 1975

[54] EXPLOSION PROOF PLASTIC ELECTRICAL ENCLOSURE

[75] Inventor: James N. Pearse, Libertyville, Ill.

[73] Assignee: Appleton Electric Company, Chicago, Ill.

[22] Filed: Sept. 16, 1974

[21] Appl. No.: 506,247

[52] U.S. Cl. .................... 174/51; 174/53; 220/88 R
[51] Int. Cl.² ........................................ H02G 3/14
[58] Field of Search ........ 174/50, 51, 53; 220/88 R, 220/3.2–3.9; 310/88

[56] References Cited
UNITED STATES PATENTS

| | | | |
|---|---|---|---|
| 3,187,084 | 6/1965 | Stillman et al. | 174/53 X |
| 3,210,458 | 10/1965 | Palmer | 174/53 X |
| 3,634,598 | 1/1972 | Stanfield | 174/51 |
| 3,724,706 | 4/1973 | Slocum | 174/50 X |

Primary Examiner—J. V. Truhe
Assistant Examiner—David A. Tone
Attorney, Agent, or Firm—Darbo, Robertson & Vandenburgh

[57] ABSTRACT

An electrical wiring enclosure comprising a box and cover is formed primarily of plastic. At the juncture of the box and cover the two have mating metal flanges. The metal flange on the cover is a unitary part of a metallic member which extends across the inside of the cover in the area in which switches, etc., are mounted. The box has threaded metallic inserts to receive electrical conduit. These are electrically connected to the flange of the box.

9 Claims, 4 Drawing Figures

U.S. Patent   Dec. 16, 1975   3,927,249
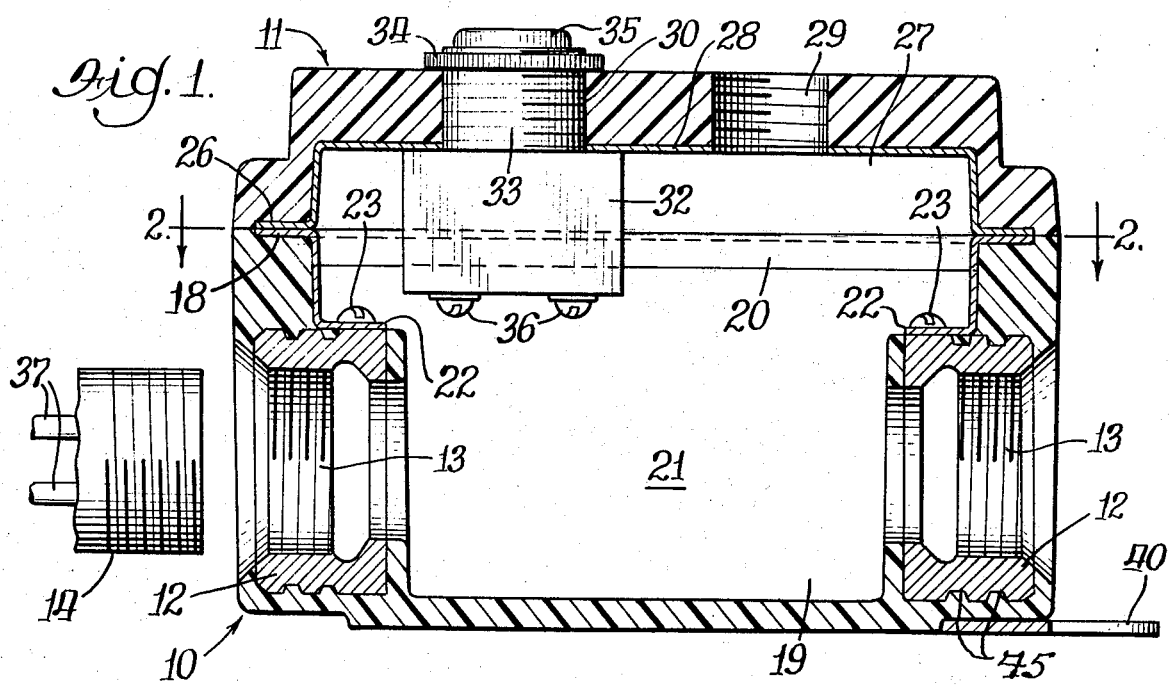
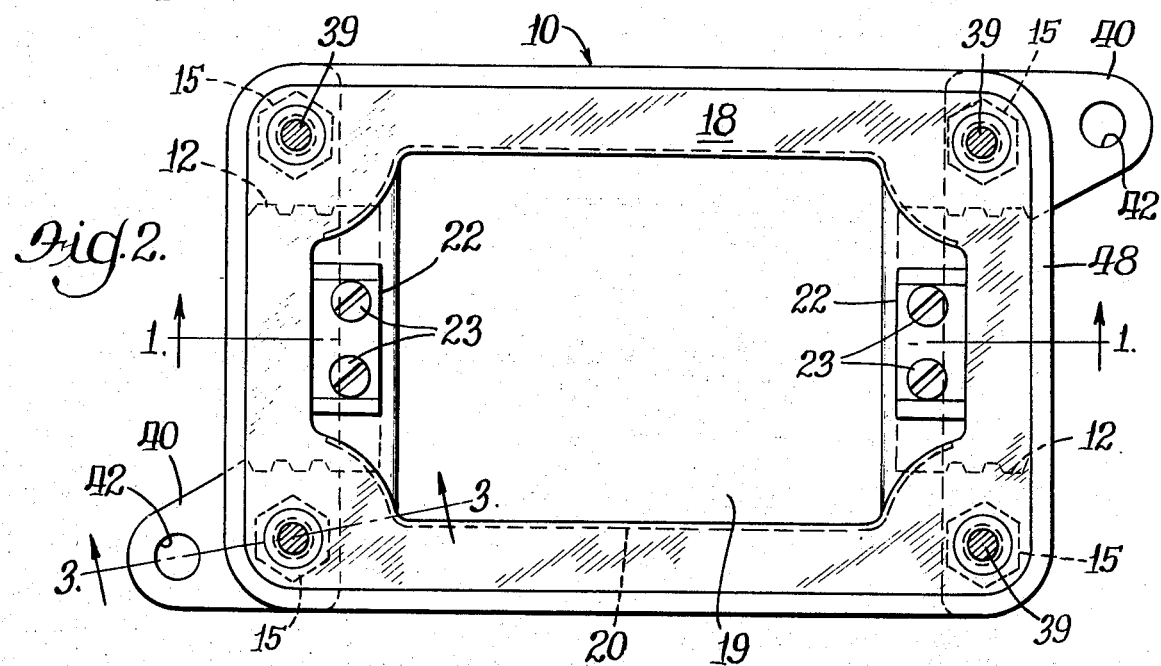
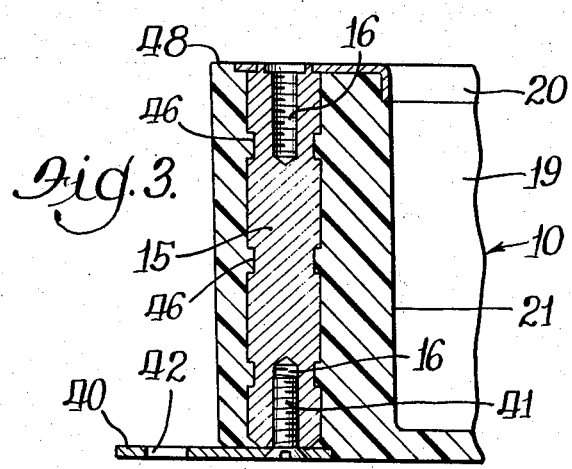
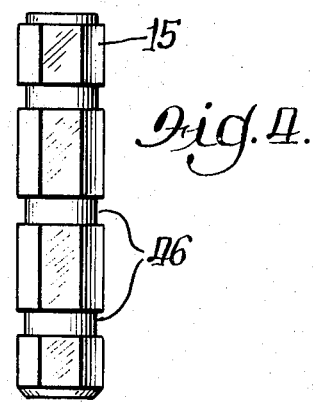

EXPLOSION PROOF PLASTIC ELECTRICAL ENCLOSURE

BACKGROUND AND SUMMARY OF THE INVENTION

"Explosion proof" electrical boxes or enclosures are intended to prevent the propagation of any flame that may occur inside the enclosure from reaching the outside of the enclosure. They are not hermetically sealed and thus explosive atmospheres which may exist on the outside of the enclosure can reach the interior of the enclosure through the comparatively small fluid passageways that will exist between the box and its cover, etc. These explosive atmospheres within the enclosure can be ignited, as for example by the arcing of an electrical switch mounted within the box with the result that an explosion will occur within the box. The explosive pressure within the box will be vented out through the same passageways, but because of the design of the passageways, no flame reaches the exterior of the box, i.e., the gases passing through the passageways are cooled sufficiently to stop the passage of flame. Thus, such boxes can be safely employed in rooms, etc., in which there are likely to be combustible gases or vapors.

These combustible gases or vapors may also be corrosive to varying degrees, and the explosion-proof enclosures may thus suffer deterioration as a result of corrosive attack. Other non-combustible gases or vapors which are highly corrosive are frequently present for these applications, which compounds the problem with respect to corrosive attack of explosion-proof enclosures. The metals most commonly used as enclosure materials are cast iron, malleable iron and aluminum, although stainless steel is occasionally used for very severe corrosive conditions at a substantial premium in cost.

It would be very desirable to use certain plastics which are relatively inert and not attackd by the corrosive vapors in some of the applications described above, particularly certain fiberglass reinforced polyester resins, but flame joints constructed from plastic materials suffered deterioration as a result of repeated explosions within the explosion-proof electrical enclosures.

It must be understood that explosion-proof enclosures must be designed to withstand repeated explosions without deterioration. For instance, these enclosures may contain devices with arcing contacts which may operate several times per minute. Because the enclosures are not hermetically sealed, explosions will occur as a result of ignition by the arcing contacts within the box. For a box constructed with flanged joints, the length of the flame path is the width of the flanged joint, and the gap of the flame path is the maximum allowable distance between the mating parts of box and cover.

If this gap should increase, it would be possible at some flame path length to gap ratio for flame to propagate to the outside of the box causing a resultant explosion in the room in which the box is located which could lead to great damage and possible loss of life.

Repeated explosions of the type described above have no effect on the flame path for boxes constructed with metal flanges, whereas the combination of hot gas at a high velocity through the flame path of a box constructed with plastic flanged joints will score the plastic leading to an increase in the effective gap height and inevitably propagation of flame to the exterior of the box.

Consequently, while it has in the past been possible to construct an enclosure with the required strength to stand repeated explosions, and plastic boxes could be constructed to resist the effects of corrosion in a fashion superior to most metal boxes, plastic boxes could not safely be used as explosion-proof enclosures because of the effects of this gap deterioration due to repeated explosions within the box.

It should also be recognized that electrical enclosures for application in hazardous locations will be connected to rigid conduit or other approved wiring means in order that insulated wires may be used to transfer electrical power to and from the enclosure.

Because the metallic conduit must be safely grounded, it is also necessary that the electrical enclosure afford a low ohmic resistance to the passage of fault current to the conduit, or to maintain bonding continuity. This presents no problem where the explosion-proof electrical enclosure is constructed of metal, but requires that special provision be made to maintain this continuity if the enclosure is constructed of plastic materials which are relatively non-conducting.

There is a further requirement in hazardous location areas that the chance of sparks initiating due to the discharge of static electricity be kept to a minimum. For an enclosure constructed of plastic, great care must be taken to assure that all exposed metallic parts be effectively grounded to prevent the build-up of static electric charges on these exposed metallic parts which could lead to a static spark under certain conditions that would initiate an explosion outside of the box. While it would be possible to control the resistivity of the plastic material in such a fashion that dangerous charges would be bled from exposed metal parts, the requirements in formulating a plastic material with these characteristics might conflict with optimum corrosion resistance for the material or with the advantage that a relatively non-conducting plastic enclosure has in comparison with metal for enclosing live electrical parts.

For instance, great care must be taken in metallic enclosures to isolate live electrical parts from the walls of the metallic enclosure to assure that electrical faults will not occur and destroy the effectiveness of the equipment installed within the enclosure. Relative non-conducting plastic is much safer in this respect, as is obvious to those skilled in the art.

An object of this invention is to provide an explosion-proof enclosure substantially constructed of plastic of a flat joint construction which will not deteriorate due to repeated explosions within the enclosure.

Another object is to provide an electrical enclosure which will maintain continuity of the conduit ground from each conduit entry way to each other conduit entry way.

A further object is to provide an explosion-proof enclosure with all exposed metal parts conductively bonded to each other to minimize the danger of a spark due to static electricity.

Another object is to provide an explosion-proof enclosure of materials specifically engineered for maximum resistance to the effects of corrosion for the most severe applications.

A further object is to provide an explosion-proof enclosure that may be manufactured at a minimum cost.

DESCRIPTION OF THE DRAWINGS

FIG. 1 is a section through an embodiment of my invention comprising a box and cover;

FIG. 2 is a plan view of the box as seen at line 2—2 of FIG. 1;

FIG. 3 is a partial section as viewed at line 3—3 of FIG. 2; and

FIG. 4 is an elevational view of the stud which is incorporated in each corner of the box.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

In the disclosed embodiment there is an explosion-proof electrical enclosure consisting of a box, generally 10, and a cover, generally 11. The box and cover are primarily plastic. The plastic can be a polyester resin such as that sold by Rostone Corporation under the trademark Rosite or it could be a polymerized acetaldehyde resin such as that sold under the trademark Delrin. Others of the various available plastic materials also could be employed.

The box has two annular metal inserts 12. These are internally threaded at 13 to receive and engage the threads on the ends of electrical conduit 14. At each of the four corners of the box is a metallic insert 15 having internal threads 16 at each end thereof. The face of the box which mates with a corresponding face of the cover is defined by a metallic flange 18. This flange completely encircles the internal opening 19 defined by the box. This flange has integral portions 20 which extend down in juxtaposition to the internal plastic walls 21. At the ends of the opening 19 those portions extend farther down and abut against the top of the inserts 12 as seen at 22. Metallic screws 23 extend through these portions 22 and are threaded into inserts 12.

The cover likewise has a metallic flange 26 which encircles the internal opening 27 defined by the cover. This flange 26 is a peripheral part of a dished member having a flat base 28 which extends across the top interior of the cover 11. The cover has threaded openings 29 and 30 for holding electrical components such as a push-button switch 32, a signal light, etc. Switch 32 has a threaded mounting member 33 which is screwed into opening 30. A locking ring or an escutcheon plate 34 is threaded onto member 33 on the outside of the cover. Projecting from mounting member 33 is a push-button 35 for actuating the switch (or it could be the lens of a signal light). At least part of the case of switch 32 where it abuts base 28 is of metal to thereby ground the switch. Screw terminals 36 are provided for making electrical connections to the wiring within the box, as for example to wires 37 which are brought in through conduit 14.

The cover is held to the box by screws 39 which project through openings in the corners of the cover, with their heads on the exterior of the cover, and are screwed into the adjacent ends of inserts 15. Various means can be employed for mounting the box on walls, etc. One such means would be to use mounting brackets 40 which are attached to the inserts 15 by means of screws 41. Brackets 40 have openings 42 through which mounting screws, bolts, etc., may project for affixation to a wall, etc.

The box and cover can be formed by injection molding. The inserts 12 and 15 would be placed in the mold before the plastic was injected therein. Thus, they would be imbedded in the plastic when it was injected into the mold. To make this imbedment secure, the inserts 12 and 15 have grooves 45 and 46, respectively, which define ridges therebetween. If desired, each of them may be provided with longitudinal grooves or ridges to also obtain a rotational interlock between the plastic and the metal. Alternatively, the inserts 12 and 15 could be glued in place after molding of the box by means of properly selected resins. The flange 18 could also be affixed to the inserts 12 by screws 23 and positioned in the mold at the same time as the inserts. Alternatively, this assembly of the flange could be completed after the box was otherwise molded. Similarly, the deep dish member which defines flange 26 and base 28 could be positioned in the cover mold before the cover was molded therein. Alternatively, these could be formed as separate parts and subsequently assembled.

The flanges 18, 26 do not extend completely to the exterior of the enclosure. Thus there are plastic portions, e.g. portion 48 on box 10, which surround the metal flanges 18, 26. For all practical purposes, these exterior plastic faces (e.g. 48) are coplanar with the flanges 18, 26. The two define a plane which forms the demarcation between the box and the cover and which is at substantially right angles to the internal walls which define openings 19, 27. While the exterior plastic faces (e.g. 48) are, in the described embodiment, coplanar with the metal flanges (e.g. 18) this need not be exact.

While, from the drawings, it might appear that the box and cover at this plane are in complete face to face contact, this is not actually the case. Due to surface irregularities there are minute fluid passageways which exist between the box and the cover at this plane. These passageways provide vents for the escape of the gases from the interior of the enclosure, which gases occur by reason of an explosion within the enclosure. To retard erosion of these passageways, the flanges 18, 26 are formed of an erosion resistant metal, as for example, stainless steel, hard bronze, etc. The components that form these flanges can be manufactured quite inexpensively. They can be produced of relatively thin metal, particularly as compared to the thickness of metal that would be required for dimensional stability were the complete box wall to be formed of such a metal. They can be manufactured by an inexpensive metal stamping process. The inserts 12 and 15 need not be of any special metal, but can be soft iron. Quantities thereof can be rapidly produced on a screw machine. Of course, the plastic molding of the box and cover is a comparatively inexpensive manufacturing process on a mass production basis.

Assuming that conduit 14 is grounded in a conventional manner, the electrical components (e.g. switch 32) mounted within the box will automatically be grounded. Thus the screws 23 and the depending portions of flanges 18 (e.g. portion 22) form an electrical ground connection from the inserts 12 to the flange 18. There will be sufficient metallic contact between flanges 18 and 26 so as to provide an electrical connection therebetween. And as previously described, metallic parts of the case of switch 32 will bear against base 28 so as to form an electrical ground connection therebetween. Electrical ground connections also can be made within the box by placing a wire under one of screws 23 and tightening the screw down against the wire.

The erosion that occurs will primarily be at the inner edge of the passageways, for example, along the line where the face of flange 18 meets the depending portion 22. Since the flange 18 extends a substantial distance outwardly from this line of juncture, and because the flange is formed of an erosion resistant material, embodiments of the invention will have a long service life without incurring the danger of the propagation of flame to the exterior of the box.

In completing an installation using the illustrated embodiment, any of the openings that are not employed for electrical components or conduits would, of course, be closed with a threaded plug, Thus, if a conduit were not inserted into the right hand insert 12 a plug having pipe threads would be screwed into this opening in engagement with threads 13. Similarly, if an electrical component was not mounted in threaded opening 29 in the cover it likewise would be closed with a plug.

The described embodiment is readily adaptable to receive various sizes of conduits 14. Inserts 12 are comparatively larger in diameter for the larger sizes of conduit 14 and comparatively smaller in diameter for the smaller sizes of conduit. Portion 22 of the box flange extends comparably lower in the box for the smaller diameter inserts and descends less far in the box for the comparatively larger diameter inserts. With the comparatively smaller diameter inserts only one of mounting screws 23 per insert will be employed as compared to the two illustrated. No other changes are required in the manufacturing of boxes to receive different sizes of conduit.

I claim:

1. In an explosion proof electrical enclosure comprising a box and a cover releasably attached to the box which box and cover have internal walls defining an internal opening for electrical wiring, said box and cover have mating faces at the juncture therebetween, the improvement comprising:
    said box and cover being mainly formed of plastic and each including a metal flange at the respective face and circumscribing said opening at the face, said flanges being in immediate juxtaposition when said cover is on said box, said flanges being formed of an erosion resistant metal.

2. In an explosion proof enclosure as set forth in claim 1, wherein said faces are at approximately right angles to the inner wall of the box and have inner and outer parts, said flanges are in juxtaposition to only the inner part of said faces with the plastic being exposed at the outer part of said faces, said outer part of the faces being substantially coplanar with the respective flanges.

3. In an explosion proof enclosure comprising a box and a cover releasably attached to the box which box and cover have internal walls defining an internal opening for electrical wiring, said box and cover have mating faces at the juncture therebetween, and for use with grounded metal conduit and an electrical component adapted to be mounted on the cover and having a metallic mounting member which is intended to be connected to ground, and having a portion of the box adapted to receive and engage said conduit and a portion of the cover adapted to receive and support said component, the improvement comprising:
    said box and cover being mainly formed of plastic and each including a metal flange at the respective face and circumscribing said opening at the face, said flanges being in immediate juxtaposition when said cover is on said box, said flanges being formed of an erosion resistant metal;
    said portion of the box including a first metallic member which is in electrical contact with said conduit when the conduit is in engagement with the box;
    said portion of the cover including a second metallic member which is in electrical contact with the mounting member when the component is mounted on the cover;
    first means electrically connecting the first metallic member and the metal flange of the box, and
    second means electrically connecting the second metallic member and the flange of the cover;
    said flanges being in contact with each other thereby forming an electrical connection therebetween.

4. In an explosion proof enclosure as set forth in claim 3, wherein
    the box flange has an integral portion which is in juxtaposition to part of the internal wall of the box, said flange portion being connected to said first metallic member and forming said first means; and
    the cover flange has an integral portion which is in juxtaposition to part of the internal wall of the cover, said cover flange portion forming said second metallic member and said second means.

5. In an explosion proof enclosure as set forth in claim 4, wherein said first metallic member is annular with internal threads and ridges on the exterior thereof, said first metallic member being an insert in said plastic.

6. In an explosion proof enclosure as set forth in claim 3, wherein said first metallic member is annular with internal threads and ridges on the exterior thereof, said first metallic member being an insert in said plastic.

7. In an explosion proof enclosure as set forth in claim 6, wherein said faces are at approximately right angles to the inner wall of the box and have inner and outer parts, said flanges are in juxtaposition to only the inner part of said faces with the plastic being exposed at the outer part of said faces, said outer part of the faces being substantially coplanar with the respective flanges.

8. In an explosion proof enclosure comprising a box and a cover releasably attached to the box which box and cover have internal walls defining an internal opening for electrical wiring, said box and cover have mating faces at the juncture therebetween, said enclosure being rectangular and having four corners, said cover being attached to the box by screws and the enclosure being mounted by means of screws, the improvement comprising:
    said box and cover being mainly formed of plastic and each including a metal flange at the respective face and circumscribing said opening at the face, said flanges being in immediate juxtaposition when said cover is on said box, said flanges being formed of an erosion resistant metal; and
    a metallic stud in each of said corners of said box with a top end in juxtaposition to the box face and an opposite end in juxtaposition to the opposite side of the box, each of said ends being threaded to receive said screws.

9. In an explosion proof enclosure as set forth in claim 8, wherein said faces are at approximately right angles to the inner wall of the box and have inner and outer parts, said flanges are in juxtaposition to only the inner part of said faces with the plastic being exposed at the outer part of said faces, said outer part of the faces being substantially coplanar with the respective flanges.

* * * * *